United States Patent
Fujikura

(10) Patent No.: US 7,684,831 B2
(45) Date of Patent: Mar. 23, 2010

(54) SIGNAL PROCESSING DEVICE AND HANDS-FREE CALL DEVICE

(75) Inventor: Toshiaki Fujikura, Tokyo (JP)

(73) Assignee: Uniden Corporation, Tokyo (JP)

( * ) Notice: Subject to any disclaimer, the term of this patent is extended or adjusted under 35 U.S.C. 154(b) by 439 days.

(21) Appl. No.: 11/843,522

(22) Filed: Aug. 22, 2007

(65) Prior Publication Data

US 2009/0011800 A1    Jan. 8, 2009

(30) Foreign Application Priority Data

Jul. 2, 2007    (JP) .............................. 2007-174159

(51) Int. Cl.
    *H04M 1/00*    (2006.01)
(52) U.S. Cl. .................... 455/569.1; 455/219; 455/220; 455/225; 379/388.05; 379/388.06; 379/388.07; 379/390.01; 379/390.03
(58) Field of Classification Search ............. 455/569.1, 455/569.2, 570, 218–225; 379/388.01, 388.05–388.07, 379/390.01–390.04
    See application file for complete search history.

(56) References Cited

U.S. PATENT DOCUMENTS

| | | | | |
|---|---|---|---|---|
| 4,513,177 A | * | 4/1985 | Nishino et al. | ......... 379/388.06 |
| 5,046,081 A | * | 9/1991 | Umemoto | .................... 455/462 |
| 6,097,971 A | * | 8/2000 | Hosoi | .......................... 455/570 |
| 6,154,639 A | * | 11/2000 | Kanazumi et al. | ............. 455/74 |
| 2008/0247336 A1 | * | 10/2008 | Sugitani | ..................... 370/280 |

FOREIGN PATENT DOCUMENTS

| | | |
|---|---|---|
| JP | 10-093681 A | 4/1998 |
| JP | 10-093681 A1 | 4/1998 |

* cited by examiner

*Primary Examiner*—Tuan A Tran
(74) *Attorney, Agent, or Firm*—Steven J. Hultquist; Intellectual Property/Technology Law

(57) ABSTRACT

A signal processing device includes: a speaker amplifier for amplifying a reception voice; a reception voice attenuator for attenuating the reception voice inputted to the speaker amplifier during a voice transmission mode; a reception voice detection circuit for detecting the reception voice outputted from the speaker amplifier; a microphone amplifier for amplifying a transmission voice inputted to a microphone; a transmission voice attenuator for attenuating the transmission voice outputted by the microphone amplifier during a voice reception mode; a transmission voice detection circuit for detecting the transmission voice outputted by the microphone amplifier; and a discriminator for discriminating the mode to be operated among the voice transmission mode and the voice reception mode on the basis of detection outputs from the reception voice detection circuit and the transmission voice detection circuit.

2 Claims, 4 Drawing Sheets

SIGNAL PROCESSING DEVICE AND HANDS-FREE CALL DEVICE

CROSS-REFERENCES TO RELATED APPLICATIONS

This application relates to and claims priority from Japanese Patent Application No. 2007-174159, filed on Jul. 2, 2007, the entire disclosure of which is incorporated herein by reference.

BACKGROUND

The present invention relates to a signal processing device and to a hands-free call device including the signal processing device.

In a hands-free call device provided with a function for carrying out voice-amplified calls using a speaker and a microphone instead of a handset, communication may be perturbed when the speaker and the microphone are used simultaneously, as a result of which there forms a closed loop through acoustic coupling such that howling occurs when the gain of the closed loop exceeds 1. In order to ensure stable communication in such a hands-free call device provided with a voice-amplified call function, therefore, some scheme must be resorted to for constantly keeping the closed loop gain at or below 1.

A voice switch is one such known scheme. In a voice switch, the closed loop gain is kept at or below 1 by monitoring the transmission voice signal level and the reception voice signal level and by increasing the signal attenuation of the smaller signal level. Voice switches, in which computations are simpler than in echo suppressors, are advantageous in that they can be built easily, since they not require a large memory capacity for storing adaptive filter coefficients, status variables and the like. Documents describing voice switches include, for instance, Japanese Unexamined Patent Application Laid-open No. H10-93681.

In a conventional voice switch, however, the mode that is to be operated is discriminated between a voice transmission mode and a voice reception mode, by comparing the transmission voice signal level and reception voice signal level, and hence the echo of the reception voice outputted by the speaker enters the microphone and becomes superposed with the transmission voice, which makes it difficult to tell apart the echo of reception voice from the transmission voice. This means that it is difficult to judge the call direction in environments where echo is likely to occur. When a switch is switched, upon mistaking of the above echo with audio from a near-end speaker included in the transmission voice, the audio of the far-end speaker included in the reception voice is interrupted while being generated, which impairs the quality of the call.

The circuit constitution of a conventional voice switch, moreover, is extremely complex, and hence installing a voice switch in a handset was difficult. In some hands-free call devices, signal processing relating to the hands-free operation is carried out with a handset and a base set working together via wireless communication. Such devices are problematic in that the hands-free call can be perturbed should wireless communication fail.

SUMMARY

With a view of solving the above problems, it is an object of the present invention to provide a signal processing device, and a hands-free call device including that signal processing device, that allow realizing stable switching between voice transmission and voice reception, using a simple circuit constitution.

In order to solve the above problems, the signal processing device according to the present invention includes: a speaker amplifier for amplifying a reception voice; a reception voice attenuator for attenuating the reception voice inputted to the speaker amplifier during a voice transmission mode; a reception voice detection unit for detecting the reception voice outputted from the speaker amplifier; a differentiating unit for differentiating a detection output signal from the reception voice detection unit; a microphone amplifier for amplifying a transmission voice inputted to a microphone; a transmission voice attenuator for attenuating the transmission voice outputted by the microphone amplifier during a voice reception mode; a transmission voice detection unit for detecting the transmission voice outputted by the microphone amplifier; an integrating unit for integrating a detection output signal from the transmission voice detection unit; and a discrimination elevator for discriminating the mode to be operated among the voice transmission mode and the voice reception mode on the basis of respective detection output signals from the differentiating unit and the integrating unit.

Since such a signal processing device has a differentiating unit and an integrating unit, the reception voice detection output precedes in time the transmission voice detection output and is transmitted first to the discrimination elevator, even in case of simultaneous conflict of reception voice detection output and transmission voice detection output. The voice reception mode can be maintained stably as a result.

The hands-free call device according to the present invention is operated in a mode among a handset mode and a hands-free mode. The hands-free call device includes a handset including the above-described signal processing device, and a base set wirelessly connectable to the handset. In the hands-free mode, the handset processes all signals relating to hands-free operation.

The signal processing device according to the present invention can be realized with a simple circuit constitution, and hence can be installed inside a handset. As a result, the handset can handle all signal processing relating to hands-free operation, without working together with the base set.

The present invention provides thus a signal processing device, and a hands-free call device including that signal processing device, that allow realizing stable switching between transmission and reception.

DETAILED DESCRIPTION

Embodiments of the present invention are explained below with reference to accompanying drawings.

Figure 1:
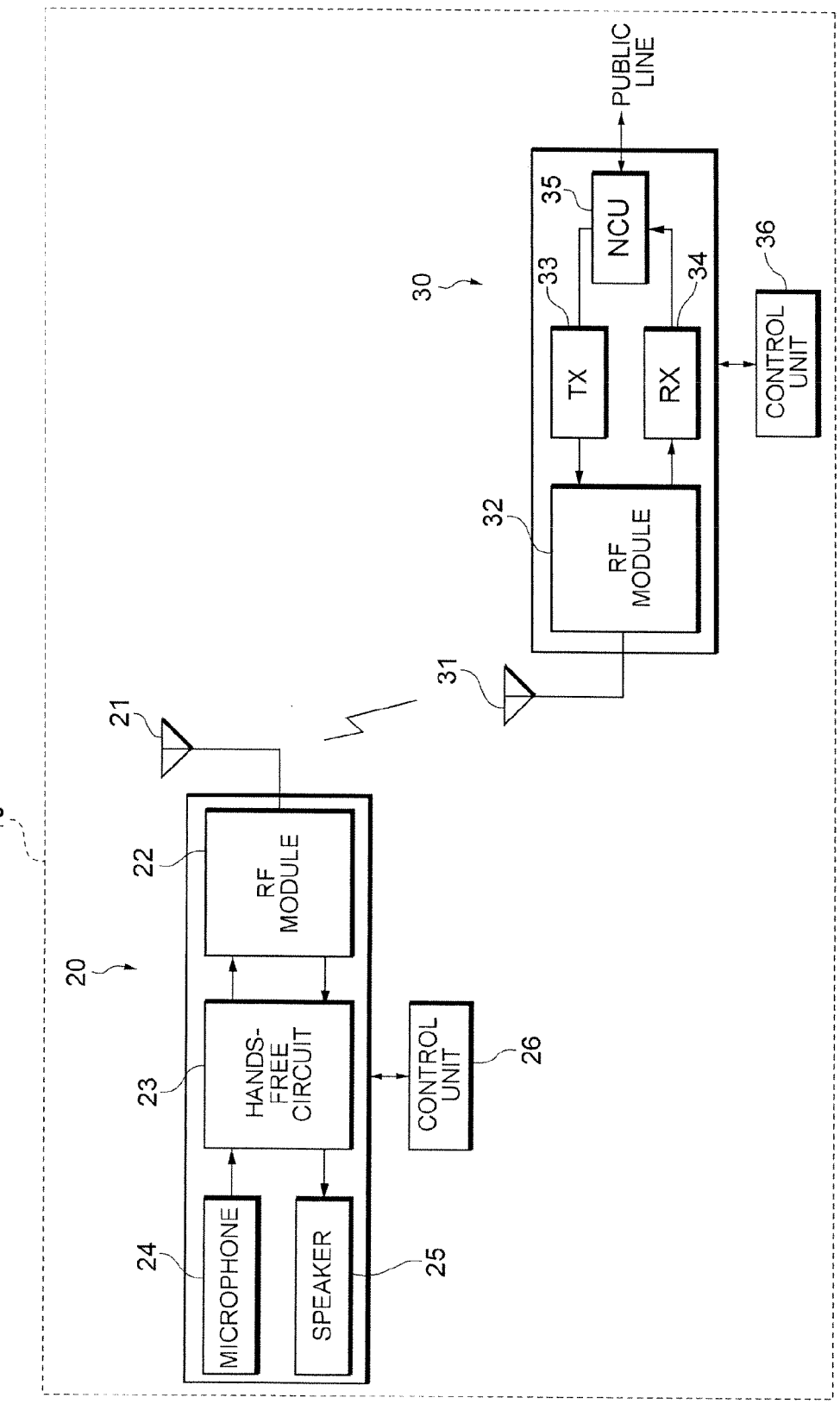
FIG. 1 is a functional block diagram of a hands-free call device according to the present embodiment.

FIG. 1 is a functional block diagram illustrating a hands-free call device 10 according to the present embodiment. The hands-free call device 10 includes a handset 20 and a base set 30. The handset 20 includes an antenna 21 for exchanging radio wave signals; a high-frequency (RF) module 22 for modulating and demodulating an audio signal; a hands-free circuit (signal processing device) 23 for performing signal processing of a hands-free call; a microphone 24 for inputting a transmission voice; a speaker 25 for amplifying a reception voice; and a control unit 26 for controlling the foregoing. The handset 20 can operate in any call mode among a handset mode and a hands-free mode. The handset mode is a call mode in which the speaker holds the handset 20 during a call. The hands-free mode is a call mode in which the speaker does not hold the handset 20 during a call.

The base set 30 includes an antenna 31 for exchanging radio wave signals; a high-frequency (RF) module 32 for modulating and demodulating an audio signal; a transmission processing unit (TX) 33 for amplifying and the like a transmission voice transmitted via a public line; a reception processing unit (RX) 34 for amplifying and the like a reception voice transmitted via a wireless line; a network control unit (NCU) 35 connected to the public line, and a control unit 36 for controlling the foregoing.

Figure 2:
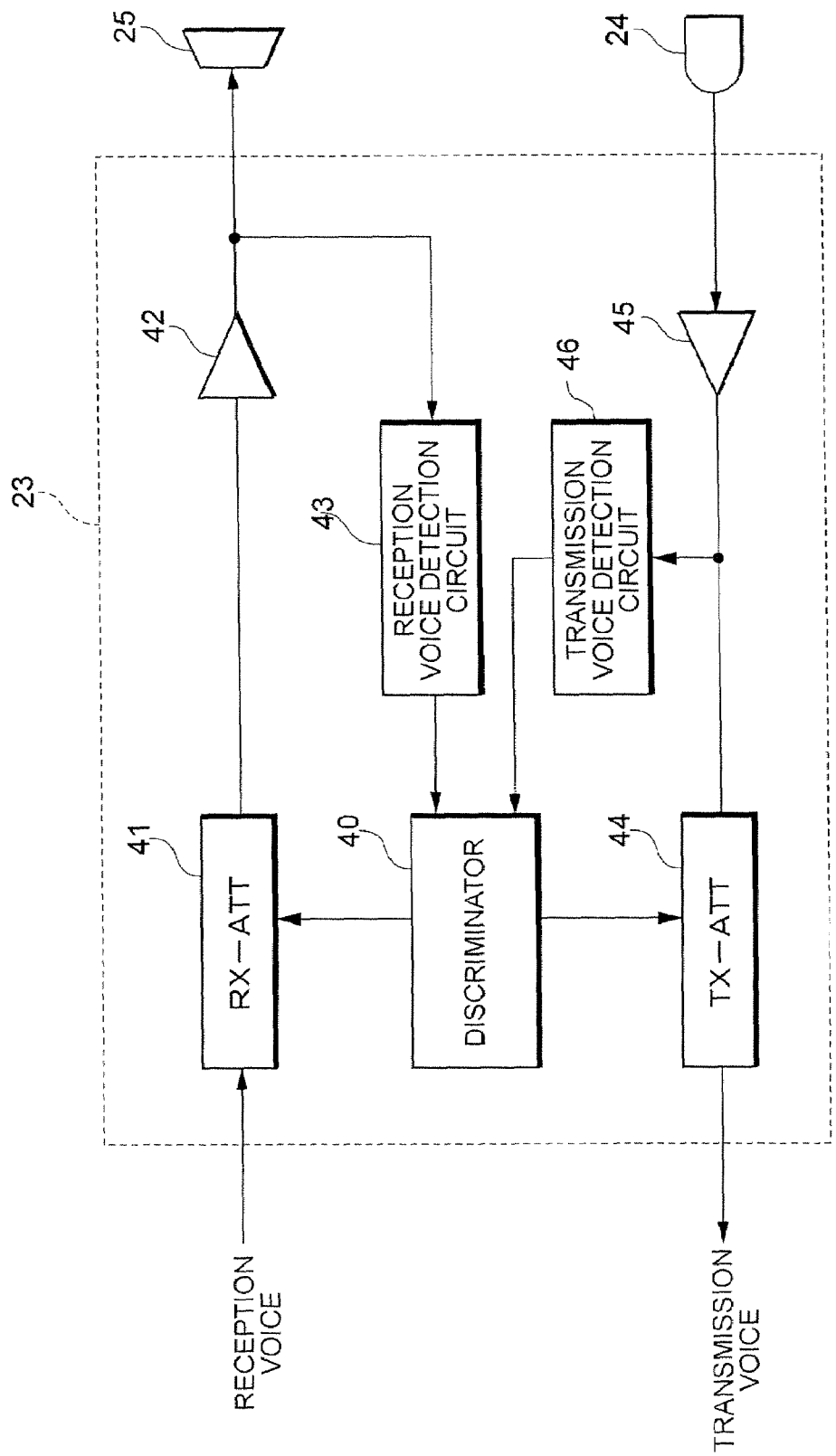
FIG. 2 is a functional block diagram of a hands-free circuit according to the present embodiment.

FIG. 2 is a functional block diagram illustrating the hands-free circuit 23 according to the present embodiment. The hands-free circuit 23 includes a reception voice attenuator 41 connected to an input terminal of a speaker amplifier 42, a reception voice detection circuit 43 connected to an output terminal of the speaker amplifier 42, a transmission voice attenuator 44 connected to an output terminal of a microphone amplifier 45, a transmission voice detection circuit 46 connected to the output terminal of the microphone amplifier 45, and a discriminator 40 for controlling the attenuation of the reception voice attenuator 41 and the transmission voice attenuator 44. The speaker amplifier 42 amplifies the signal level of the reception voice, and outputs it to the speaker 25. The reception voice detection circuit 43 detects the reception voice signal outputted by the speaker amplifier 42. The microphone amplifier 45 amplifies the signal level of the transmission voice inputted via the microphone 24. The transmission voice detection circuit 46 detects a transmission voice signal outputted by the microphone amplifier 45.

Figure 3:
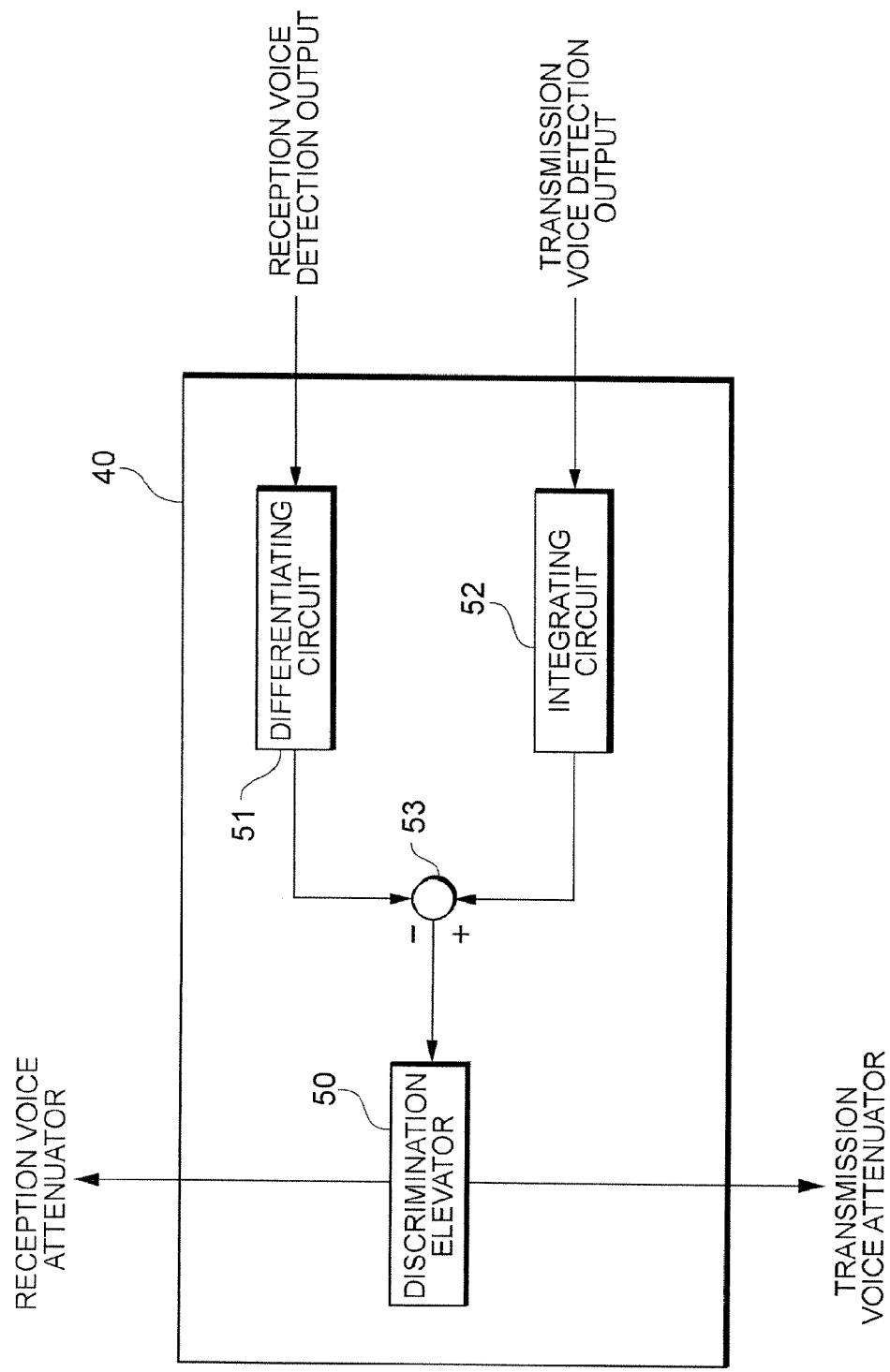
FIG. 3 is a functional block diagram of a discriminator according to the present embodiment.

The discriminator 40 receives respective detection outputs from the reception voice detection circuit 43 and the transmission voice detection circuit 46, and discriminates the operative mode to be operated among a voice transmission mode and a voice reception mode. In the voice transmission mode, the discriminator 40 increases the attenuation of the reception voice signal through the reception voice attenuator 41, while in the voice reception mode the discriminator 40 increases the attenuation of the transmission voice signal through the transmission voice attenuator 44. As illustrated in FIG. 3, the discriminator 40 includes a discrimination elevator 50, a differentiating circuit 51, an integrating circuit 52, and a differential circuit 53. The discrimination elevator 50 receives the respective detection outputs from the reception voice detection circuit 43 and the transmission voice detection circuit 46, so that the respective attenuations of the reception voice attenuator 41 and the transmission voice attenuator 44 are controlled through changes in the potential of the discrimination elevator 50. When the potential of the discrimination elevator 50 is at or below a first threshold value potential (for instance 1.5V), the hands-free circuit 23 operates in the voice reception mode, while when the potential of the discrimination elevator 50 is at or above a second threshold value potential (for instance, 2.0V), the hands-free circuit 23 operates in the voice transmission mode.

In the absence of the detection outputs from the reception voice detection circuit 43 and the transmission voice detection circuit 46 (idle state), the potential of the discrimination elevator 50 is set to a potential (at or below the first threshold value potential) that designates the voice reception mode. The detection output of the reception voice detection circuit 43 is differentiated by the differentiating circuit 51, while the detection output of the transmission voice detection circuit 46 is integrated by the integrating circuit 52. The discrimination elevator 50 receives an output in which the differentiated output of the differentiating circuit 51 is subtracted from the integrated output of the integrating circuit 52. Thus, the detection output from the reception voice detection circuit 43 has the effect of lowering the potential of the discrimination elevator 50 via the differentiating circuit 51, while the detection output from the transmission voice detection circuit 46 has the effect of raising the potential of the discrimination elevator 50 via the integrating circuit 52.

When a reception voice is detected and a transmission voice is not detected, the potential of the discrimination elevator 50 drops, and hence the operative mode of the hands-free circuit 23 changes over to voice reception mode. On the other hand, when a transmission voice is detected and the reception voice is not detected, the potential of the discrimination elevator 50 rises, and hence the operative mode of the hands-free circuit 23 changes over to voice transmission mode.

When a reception voice and a transmission voice are detected simultaneously (such as in case of acoustic coupling of the speaker 25 and the microphone 24), the time that the transmission voice detection output takes to be transmitted to the discrimination elevator 50 via the integrating circuit 52 is longer (i.e., the delay time thereof is greater) than the time that the reception voice detection output takes to be transmitted to the discrimination elevator 50 via the differentiating circuit 51. As a result, the reception voice detection output takes precedence over the transmission voice detection output and thus the potential of the discrimination elevator 50 drops, whereby the operative mode of the hands-free circuit 23 changes over to voice reception mode.

As explained above, the hands-free circuit 23 includes a differentiating circuit 51 and an integrating circuit 52 in the discriminator 40, such that even in case of simultaneous conflict between reception voice detection output and transmission voice detection output, the reception voice detection output precedes in time the transmission voice detection output and is transmitted first to the discrimination elevator 50, whereby the voice reception mode can be stabilized and maintained. Moreover, the detection output can be limited deliberately, so that detection output beyond a certain point is not transmitted to the discrimination elevator 50 even in case of increased audio feedback caused by acoustic coupling of the speaker 25 and the microphone 24. This means that the voice reception mode can be stabilized and maintained irrespective of the gain in the speaker amplifier 42 and the microphone amplifier 45.

In the hands-free circuit 23, reception voice detection is carried out through extraction of the reception voice from the speaker amplifier 42, and hence a stable voice transmission mode can be maintained through the attenuating action on a reception voice by the reception voice attenuator 41.

Figure 4:
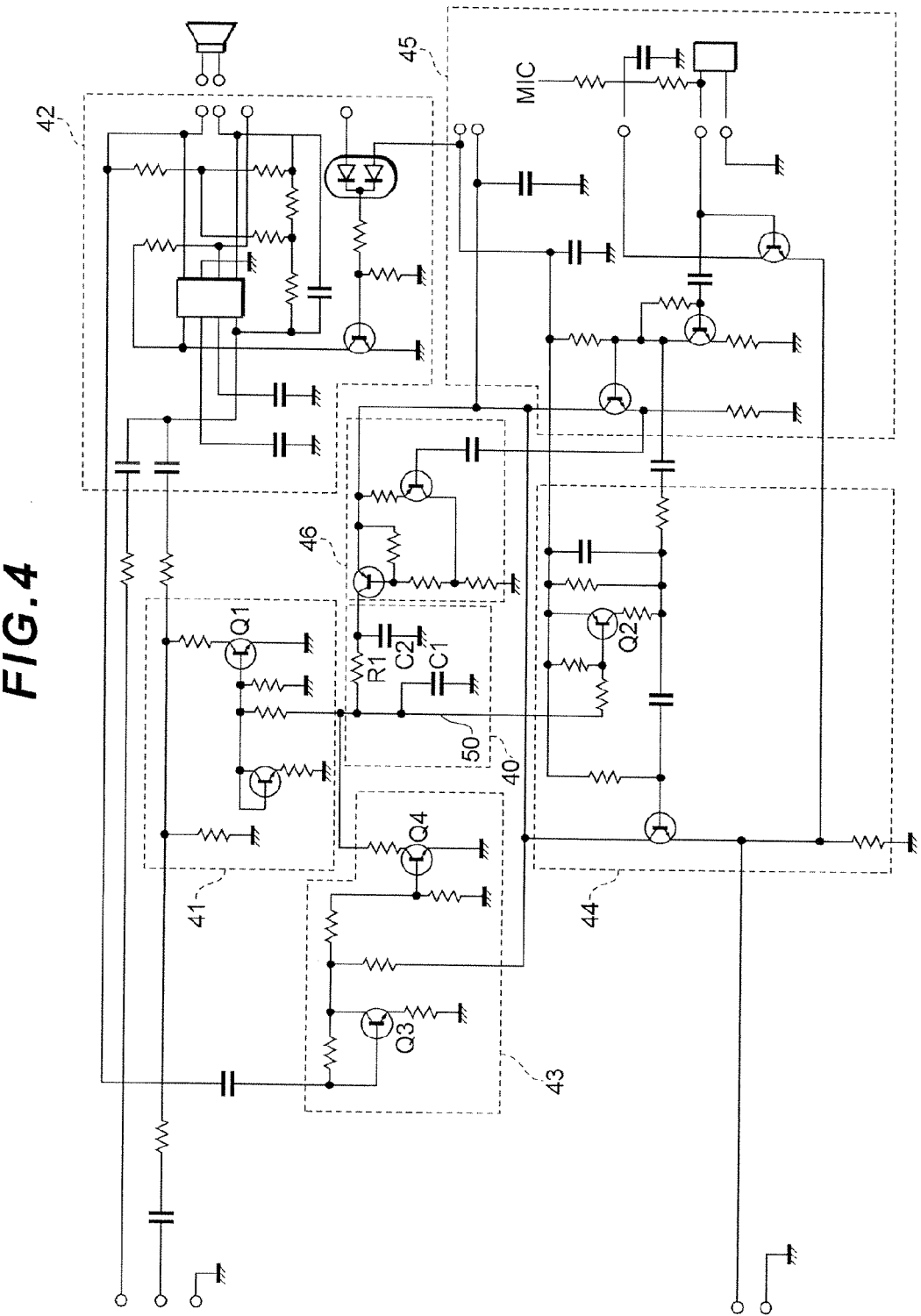
FIG. 4 is a circuit diagram of a hands-free circuit according to the present embodiment.

FIG. 4 illustrates a circuit diagram of the hands-free circuit 23 according to the present embodiment. Functional blocks identical to those illustrated in FIG. 2 are denoted with identical reference numerals. The segmentation of the functional blocks is made for convenience, and part of a given functional block may be also part of another functional block.

The reception voice attenuator 41 has a transistor Q1. When the potential of the discrimination elevator 50 exceeds the second threshold value potential, the transistor Q1 is turned on, and the reception voice is attenuated. On the other hand, when the potential of the discrimination elevator 50 drops below the first threshold value potential, the transistor Q1 is turned off, and the reception voice is not attenuated but passes through the reception voice attenuator 41. The transmission voice attenuator 44 has a transistor Q2. When the potential of the discrimination elevator 50 exceeds the second threshold value potential, the transistor Q2 is turned off, and the transmission voice is not attenuated but passes through the transmission voice attenuator 44. On the other hand, when the potential of the discrimination elevator 50 drops below the first threshold value potential, the transistor Q2 is turned on, and the transmission voice is attenuated.

The reception voice detection circuit 43 has transistors Q3 and Q4. When a reception voice is detected, a repeated switching operation of the transistors Q3 and Q4 causes charge to be drained from an integration capacitor C1 in the discriminator 40, whereby the potential of the discrimination elevator 50 is lowered. The switching operation of the transistors Q3 and Q4 corresponds to the differentiating operation of the differentiating circuit 51. When the transmission voice detection circuit 46 detects a transmission voice, detection voltage is held in a capacitor C2 in the discriminator 40, thereby raising the potential of the discrimination elevator 50 via an RC series circuit that includes a resistor R1 and the integration capacitor C1 within the discriminator 40. The RC series circuit including the resistor R1 and the integration capacitor C1 corresponds to the integrating circuit 52.

Other than through an electronic circuit such as the one illustrated in FIG. 4, the function of the hands-free circuit 23 can also be realized, for instance, through digital signal processing using a digital signal processor (DSP) or the like.

What is claimed is:

1. A signal processing device, comprising:
    a speaker amplifier for amplifying a reception voice;
    a reception voice attenuator for attenuating the reception voice inputted to the speaker amplifier during a voice transmission mode;
    a reception voice detection unit for detecting the reception voice outputted from the speaker amplifier;
    a differentiating unit for differentiating a detection output signal from the reception voice detection unit;
    a microphone amplifier for amplifying a transmission voice inputted to a microphone;
    a transmission voice attenuator for attenuating the transmission voice outputted by the microphone amplifier during a voice reception mode;
    a transmission voice detection unit for detecting the transmission voice outputted by the microphone amplifier;
    an integrating unit for integrating a detection output signal from the transmission voice detection unit; and
    a discrimination elevator for discriminating the mode to be operated among the voice transmission mode and the voice reception mode on the basis of respective detection output signals from the differentiating unit and the integrating unit.

2. A hands-free call device operated in a mode among a handset mode and a hands-free mode; comprising:
    a handset including the signal processing device as claimed in claim 1; and
    a base set wirelessly connectable to the handset,
    wherein in the hands-free mode, the handset handles all signal processing relating to hands-free operation.

* * * * *